United States Patent Office 3,347,808
Patented Oct. 17, 1967

3,347,808
COATING COMPOSITIONS
Edward Lavin, Longmeadow, and Albert H. Markhart, Wilbraham, Mass., and Robert E. Kass, Simsbury, Conn., assignors to Monsanto Company, St. Louis, Mo., a corporation of Delaware
No Drawing. Filed July 5, 1966, Ser. No. 562,458
12 Claims. (Cl. 260—29.1)

ABSTRACT OF THE DISCLOSURE

This invention relates to novel compositions of matter comprising (1) aromatic tetracarboxylic acids and their ester derivatives and (2) polyfunctional amines which are dissolved in an organic solvent. These monomeric type solutions provide coating, insulating and impregnating compositions with a high solids content, which may be applied to a substrate and then polymerized in situ to form polymeric condensate with unusual thermal stability and resistance to attack by solvents.

---

This invention is a continuation-in-part of our co-pending application Ser. No. 200,634, filed June 7, 1962, and now abandoned which in turn was a continuation-in-part of our co-pending application Ser. No. 119,846, filed June 27, 1961, and now U.S. Patent 3,190,856.

This invention relates to compositions which can be heat cured to flexible, tough, adherent, heat resistant and dielectric materials; more particularly, it relates to certain insulative and impregnating varnishes compounded with monomers that may be condensed in situ to resins of excellent binding power. The resins find use in such diverse applications as electrical insulators, glass laminates, heat resistant structural adhesives, varnishes, films, etc.

The employment of synthetic resins for electrical insulation is not new. In fact, many have found wide commercial acceptance in such applications as, for instance, magnet wire coating. In that process, wire of an appropriate gauge is first successively covered by means of a specialized technique with multiple layers of one or more enamels. The covered wire is then wound into coils for incorporation into motors, generators and the like. Prior to final assembly however, the stator and rotor coils are dipped into special varnishes which when baked will form a firmly binding envelope and will, in addition, often contribute to the total insulation of the system.

For the convenience of the trade and in reference to the operating temperatures to which the enameled and varnished wire coils are ultimately destined, a classification has been developed and applied to such enamels and varnishes (American Institute of Electrical Engineers, Insulation classification No. 1, June 1957). These classes range from 90° C. to 220° C. A class 220° C. enamel or varnish, for instance, will be employed in equipment designed for use at temperatures of 220° C. or higher. It is with this enamel and varnish class that the present invention is primarily concerned.

The introduction of synthetic organic resins in enamels of this 220° C. class is a rather recent development in the art. Nevertheless, because of an excellent balance of properties as compared to the inorganic materials constituting the bulk of the class, the new materials are already used extensively. With this development, however, has arisen the need for new varnishes capable of performing satisfactorily under the rigorous thermal conditions attending the employment of such polymers.

It is therefore an object of this invention to provide a varnish suitable for bonding electrical components or for impregnating substrates to be laminated and particularly for use on 220° C. rated magnet wire, capable of developing adequate bond strength at elevated temperatures while being at the same time compatible with the magnet wire film insulation.

It is another object of this invention to provide novel compositions of matter.

It is another object of this invention to provide laminates impregnated with a varnish having excellent heat stability properties.

It is another object of this invention to provide a structural adhesive with improved properties.

It is another object of this invention to provide a process for producing a varnish with improved heat stability properties.

These and other objects which will become evident in the course of the present disclosure have been accomplished by the formulation of compositions comprising a 3–75% by weight solution of a polyamine and a tetracarboxylic compound present in a proportion selected from the range of about 70% molar excess of the polyamine to about 5% molar excess of the tetracarboxylic compound; wherein the polyamine is selected from the class consisting of aliphatic primary diamines of from 2 to about 6 carbon atoms, aromatic primary diamines of from 6 to about 36 carbon atoms and aliphatic-aromatic primary diamines, triamines and mixtures of the foregoing, wherein the tetracarboxylic compound is selected from the group consisting of (1) tetracarboxylic compounds formed from two molecules of trimellitic anhydride joined through their free carboxylic groups, wherein the carboxylic groups on the tetracarboxylic compounds are independently selected from the group consisting of carboxylic acid esters and free carboxylic acids and (2) tetracarboxylic compounds represented by the general formula

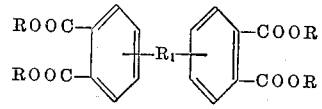

wherein R is independently selected from the group consisting of hydrogen and alkyls of from 1 to 6 carbon atoms and $R_1$ is selected from the group consisting of carbonyl, sulfur, sulfonyl, oxygen, phosphorous, phosphonyl, silicon and derivatives thereof, alkylene of from 1 to 6 carbon atoms and arylene of from 6 to 16 carbon atoms, and mixtures of the foregoing tetracarboxylic compounds. The compositions are essentially organic liquid or aqueous solutions of at least one tetracarboxylic component and one polyamine component.

After application to a substrate and baking, the monomers condense to the resinous structures credited for the excellent properties enumerated earlier.

The following examples will serve to illustrate but not to limit the present invention.

EXAMPLE I

*Preparation of the varnish.*—A solution of 23.3 g. (0.117 mol) of 4,4'-oxydianiline (ODA) in 54 g. of a solvent mixture containing 66 parts by weight dioxane and 33 parts by weight N-methylpyrrolidone is mixed with another solution consisting of 32.5 g. (0.079 mol) of the diethyl ester isomers of benzophenonetetracarboxylic acid (BPTA) in 76 g. of the same dioxane-pyrrolidone mixture.

This stable 30% by weight solids solution is then used to varnish coils of "ML" polymer coated magnet wire. "ML" is a commercially available enamel for class 220° C. wire and, as a magnet wire coating, is a polymeric reaction product of pyromellitic dianhydride and oxydianiline.

*Varnishing wire coils.*—The method used is an adaptation of that published by John Dexter in "Insulation," September 1955, page 12.

The coated wire samples are heat annealed for one hour at 200° C. The annealed wire is then closely wound on a ¼ inch diameter mandrel and cut into 3¾ inch long sections. These sections are dipped in the varnish and dried two hours at 100° C. and two hours at 175° C. Another reverse dip follows with the same drying cycle. A film build increase of 1 to 2 mils is accomplished in this manner. The varnished coils are finally cured for eight hours at 225° C.

*Bond strength determination.*—In this test, the varnished lengths of coil are laid flat on two fixed supports which are approximately two inches apart and a measured force is applied downwards on the coil until the coil breaks. Since the unvarnished coil's resistance to this treatment is negligible, the force needed to break the coils is essentially a measure of the flexural breaking strength of the curved varnish envelope. The test procedure is carried out with an Instron tester. A minimum flexural breaking strength of 5 lbs./mil of varnish thickness is considered acceptable for the purposes of this invention.

Bond strength is determined at room temperature and at higher temperatures. In the latter cases, the length of coil is heated by electrical current, the temperature being measured by a thermocouple pyrometer system. Once the desired temperature is reached, the bond strength is determined.

The following bond strength results were obtained by the method just described for "ML" enameled wire coiled and coated with the varnish of Example I and for purposes of comparison, for the same wire coated with "ML" varnish. "ML" varnish is a polymer solution containing about 15% solids of the uncured polymer and is available commercially for application to "ML" enameled coils. The results are given in pounds breaking strength at two different temperatures.

| Varnish | Bond Strength of Varnished Coils, Pounds Breaking Strength | |
|---|---|---|
| | 25° C. | 180° C. |
| Example I | 28.3 | 23.4 |
| "ML" | 8.5 | 6.5 |

The greater bond strength of the Example I varnish is evident. This is a rather significant improvement in electrical varnish especially in consideration of the centrifugal forces to which varnished coils are submitted during their performance in generators and motors.

An additional good feature of the Example I varnish lies in its compatibility with class 220° C. enameled wires. This compatibility can be demonstrated by comparing the one-kilovolt life of wires coated and varnished with the different enamels and varnishes.

*1 kilovolt-life test.*—This test is an adaptation of the American Institute of Electrical Engineers specification No. 57, dated October 1955. It is a measure of the period in which intertwined strands of enameled wire coated with varnish can be exposed at a particular temperature before the enamel and varnish will fail as electrical insulation upon application of 1000 volts to the system for one second.

When tested in this manner, the one kilovolt life of twists of ML-enameled wires was found to be only 632 hours at 300° C. while that of the same enameled wire covered with the varnish of Example I was 776 hours at the same temperature. The varnish of Example I therefore adds greatly to the utility of the 220° C. class enameled wires.

EXAMPLE II

A solution of 32.5 g. of the diethyl ester isomers of benzophenone tetracarboxylic acid dianhydride (BTDA) in 64.7 g. acetone is mixed with another solution made of 23.3 g. 4,4'-oxydianiline in 64.7 g. cresylic acid. The cresylic acid is a tar acid boiling between 195 and 227° C.

The varnish was applied to coils and tested as in Example I. The bond strength data is given below.

| Varnish | Bond Strength of Coil Varnish, Pounds Breaking Strength | | |
|---|---|---|---|
| | 25° C. | 180° C. | 225° C. |
| Example II | 32 | 22.5 | 17.5 |

Even at 225° C., the varnish retains much of its strength.

EXAMPLE III

A solution of 16.3 g. (0.082 mol) 4,4'-oxydianiline in 56.5 g. cresylic acid was added to a slurry of 32.5 g. of the diethyl ester isomers of benzophenone tetracarboxylic acid dianhydride (BTDA) in 56.4 g. of Solvesso 100. The latter solvent is a hydrocarbon petroleum fraction of high aromatic content and has a distillation range of 160–180° C.

The resulting mixture is a clear, stable solution. It was applied to coils in the usual manner and when tested for bond strength, gave the following results:

| Varnish | Bond Strength of Coil Varnish, Pounds Breaking Strength | | |
|---|---|---|---|
| | 25° C. | 180° C. | 225° C. |
| Example III | 46 | 27 | 16.5 |

It becomes evident, on comparing these results to those obtained for the varnishes of the preceding examples that a decrease in the molar excess of the di-primary amine does not lessen the bonding strength of these varnishes.

EXAMPLE IV

Crude dianhydride-forming benzophenonetetracarboxylic acid, 21.5 g. (0.06 mol), is heated one hour at 115° C. in 25 g. N-methylpyrrolidone to effect solution. A solution of an equimolar amount of 4,4'-diaminodiphenylmethane, 11.9 g., in a mixture of 16 g. xylene and 10 g. N-methylpyrrolidone is then added to the acid solution.

The resulting 40% solids by weight monomer solution was applied to coils and cured as described in Example I, and the flexural bond strength was determined by the usual procedure.

| Varnish | Bond Strength of Coil Varnish, Pounds Breaking Strength | | |
|---|---|---|---|
| | 25° C. | 180° C. | 225° C. |
| Example IV | 45 | 27.5 | 8.5 |
| (Duplicate) | 35.5 | 22 | 16 |

These results compare very well with those of the monomeric solutions of the di-half ester derivatives and indicate that the corresponding free tetracarboxylic acids may be used to advantage in the applications of interest.

A 26% solids by weight solution of equimolar amounts of pyromellitic acid and 4,4'-oxydianiline in N-methylpyrrolidone gave only flaked, powdery residues when coated and cured in the usual manner. In contrast, a similar solution of benzophenonetetracarboxylic acid and oxydianiline gave very flexible, shiny films.

EXAMPLE V

The following materials are placed in a three-neck flask equipped for stirring and refluxing: 25 g. (0.071 mol) benzophenonetetracarboxylic acid dianhydride, 11 g. anhydrous ethyl alcohol and 11 g. N-methylpyrrolidone. The mixture is brought to reflux temperature. The dianhydride dissolves completely in a few minutes. The heating and stirring is continued for approximately two hours and, upon cooling, a clear solution of the diethyl esters is obtained. There is then added another solution consisting of 16.1 g. (0.081 mol) 4,4'-diaminodiphenylmethane in 20 g. N-methylpyrrolidone. No heat is evolved and no significant increase in viscosity is observed. The resulting solution remains completely dilutable with acetone.

For the present purposes, this 58% by weight solution of monomers was diluted with 31 g. xylene to produce a clear, stable impregnating varnish.

EXAMPLE VI

Copper wire, AWG No. 18 (0.0403 inch diameter), is coated by conventional magnet wire coating technique with six layers of an insulative enamel, thus increasing its diameter by a total thickness of approximately 3 mils. The particular enamel used is prepared as follows:

Into a 4-ounce jar are charged 6.44 g. benzophenone-tetracarboxylic acid dianhydride, 4.00 g. 4,4'-oxydianiline, 30.0 g. cresylic acid and 1.0 g. water. The mixture is stirred for 35 minutes at a bath temperature of 92–97° C. Phenol, 30.0 g., is then added and the heating and stirring are continued for five more minutes. The resulting polyamide solution has a Brookfield viscosity of 3200 centipoises at 25° C.

A similar enamel preparation in which an equimolar quantity of 4,4'-diaminodiphenylmethane was substituted for the oxydianiline gave a product with very similar properties having a Brookfield viscosity of 1900 centipoises at 25° C.

Magnet wire insulated with the first of the two enamels of this example was formed into coils as per the procedure described in Example I and varnished with the monomeric solution of Example V. The bonding strength measurements for this particular system are shown below.

| Varnish | Bond Strength of Coil Varnish, Pounds Breaking Strength | | |
|---|---|---|---|
| | 25° C. | 180° C. | 225° C. |
| Example V | 25.5 | 22.7 | 20.2 |

To be noted here is the excellent high temperature bonding strength of this particular varnish.

EXAMPLE VII

A quantity of 8.2 g. (0.020 mol) of the isomeric mixture of dianhydrides prepared from two mols of trimellitic anhydride and one mol of ethylene glycol diacetate, compounds known as TMX-220 [1], is reacted with anhydrous ethanol to produce the di-half ester isomers. After evaporation of the excess alcohol, the glassy, soft product is dissolved in 40 g. of a 1:1 mixture of cresylic acid and Solvesso 100. To this solution is added 6 g. (0.030 mol) of 4,4'-oxydianiline in 24 g. cresol.

---

[1] The structural formula of one isomer of the compound is:

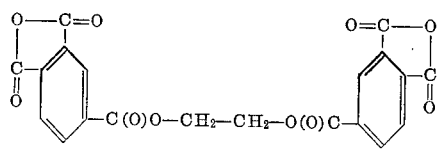

The clear, stable solution was used to varnish coils according to the procedure found in Example I. The bond strength determinations gave the following results:

| Varnish | Bond Strength of Coil Varnish, Pounds Breaking Strength | |
|---|---|---|
| | 25° C. | 180° C. |
| Example VII | 21 | 9.5 |

In estimating these results, it should be remembered that this varnish has a solids content of 20% by weight only and that the resulting cured film on double dipped coils is thinner than usual, i.e., 0.7 mils as opposed to the 1.5–2.0 mil normal thickness. Even with this low build, the varnish proves satisfactory as a coil binder and is better than a normally thick coat of "ML" varnish (Example I). On the other hand, these results may merely support a theory that has been advanced to the effect that the bonding strength of coil varnish is more a function of the nature of the bonding agent than that of the thickness of the coat, after a minimum thickness requirement is satisfied, of course.

EXAMPLE VIII

The relation between the one-kilovolt life data of Example I and the retention of bond strength is shown in this example.

Coils were prepared with a varnish similar to that of Example I. Some were tested directly but others were aged for 168 hours at 300° C. before testing. The bond strength determined at various temperatures for the aged and unaged samples is shown below.

| Conditioning of Coil | Bond Strength of Example I Varnish, Pounds Breaking Strength | | |
|---|---|---|---|
| | 25° C. | 180° C. | 225° C. |
| None | 42 | 30.5 | 11 |
| Aged 1 week at 300° C | 31 | 12 | 9 |

This demonstrates that the varnishes of this invention retain much of their binding strength at elevated temperature or at room temperature even after being subjected to extreme aging conditions. This parallels the one-kilovolt dielectric life data presented in Example I for the same varnish.

EXAMPLE IX

The excellent bonding properties of the varnishes of this invention can of course be used for many applications other than impregnation of magnet wire coils. This example for instance illustrates the employment of the varnishes in the lamination of glass cloth.

Style 181 glass cloth is double reverse-dipped twice in an Example III type varnish, force dried, dipped once more and air dried. In all, five coats of varnish are thus applied to the cloth before laminating. The details of the process are as follows: The bare cloth is dipped in the varnish, allowed to drain in air for 15 minutes and dried for one hour at 100° C. and for one additional hour at 175° C. The cloth is then dipped again in the reverse or upside down direction and dried in the same manner. This constitutes one double dip. Two such double dips are given to each glass cloth piece and this is followed by an extra dip and drain at room temperature for 16 hours.

Four pieces of cloth thus treated are placed on top of one another and positioned in an electrically heated hydraulic press having 9.5 x 12.5 inch platens. Forty thousand pounds of gauge pressure at 400° F. for one hour produce a densely packed, fused laminate.

EXAMPLE IX(a)

Example IX is repeated here only using an impregnating composition prepared from equimolar amounts of the diethyl ester isomers of benzophenone tetracarboxylic acid and methylene dianiline. The resulting laminate is comparable to that prepared in Example IX.

EXAMPLE IX(b)

Example IX is repeated here only using an impregnating composition prepared from equimolar amounts of the diethyl ester of isomers of benzophenone tetracarboxylic acid and meta-phenylene diamine. The resulting laminate is comparable to that prepared in Example IX.

EXAMPLE X

An impregnating solution is prepared by adding 9.64 g. (0.023 mol) of the mixed diester isomers of benzophenone tetracarboxylic acid in 38.6 g. cresylic acid to a solution of 6.95 g. (0.035 mol) 4,4'-diaminodiphenylamine in 26.3 g. cresylic acid. This solution was applied to style 181 glass cloth by techniques similar to those described in Example IX. After a similar heat and pressure cycle, a rigid bonded glass laminate resulted. Similar results are obtained when an equimolar quantity of 4,4'-diaminodiphenylmethane is substituted for the diaminodiphenylamine in the preparation of the varnish.

EXAMPLE XI

The 3,3',4,4'-isomer of benzophenonetetracarboxylic acid dianhydride, 23.8 g., is refluxed for 15 hours in 61.2 g. anhydrous ethyl alcohol. The resulting solution is evaporated to dryness, leaving a soft, tacky mass of the diethyl ester isomers of the acids. A quantity of 7.52 g. (0.018 mol) of this product is dissolved in 23.4 g. cresol and the solution is mixed with 3.64 g. (0.018 mol) 4,4'-oxydianiline in 14.6 g. cresol.

This monomer solution was immediately applied to a sheet of cold rolled steel and baked for one hour at 300° C. in an oven. A clear, light yellow, tough, abrasion resistant, heat resistant and flexible film was produced which lost only 3.2% of its weight on further baking at 300° C. for seventeen hours.

EXAMPLE XII

In this preparation, 28.3 g. of the ethyl alcohol solution of the diethyl esters of Example XI is mixed with a solution of 2.65 (0.025 mol) of m-phenylene diamine in 22 g. water.

This monomeric mixture was immediately spread on a sheet of cold rolled steel and, after baking for one hour at 250° C. produced a clear, light yellow, tough, abrasion and heat resistant film which suffered a weight loss of only 2.6% on further baking for 17 hours at 300° C.

EXAMPLE XIII

In this example, the varnishes of Examples III and V are used as structural adhesives in a technique related to the manufacture of honeycomb structures.

Two aluminum panels are first etched in dichromate cleaning solution, washed and dried. They are then coated with monomeric varnish by means of a brush. The varnish layer is dried for 30 minutes at 120° C., 30 minutes at 150° C. and 30 minutes at 200° C. A cure for 10 minutes at 300° C. follows. Another layer of the same varnish is then brushed on the cured film and dried for 30 minutes at 100° C. A third layer is applied in the same manner and dried at 50° C., overnight for instance. Thus, at this stage, each panel is covered by one cured layer of resin next to the metal and two incompletely cured layers on top.

The two panels are then pressed together in such a position that a half-inch wide contact is made between them. They are clamped in a steel assembly. Curing is then accomplished under a pressure of 5 pounds per square inch at 300° C. for one hour.

The glued panels are then cut and tested for shear strength.

| Varnish | Shear Strength, Bonded Aluminum Panels | |
|---|---|---|
| | Room Temp. Shear (p.s.i.) | High Temp. Shear (p.s.i.) |
| Example III (oxydianiline) | 1,825, 1,920 | 2,590, 2,590 (315° F.). |
| Example V (diaminodiphenylmethane). | 1,350, 1,415 | 1,810, 1,905 (335° F.). |

The data clearly demonstrate the usefulness of the present monomeric solutions for bonding aluminum panels, especially at high temperatures, even though no attempt has been made to refine the technique and the selection of monomers with a view to the obtention of optimum results.

The following Examples XIV–XIX illustrate that coating systems prepared from dicarboxylic-dicarbalkoxy monomers other than the types peculiar to this invention do not possess the useful properties of the latter. In these examples the curing time was curtailed on evidence of unsatisfactory film formation.

EXAMPLE XIV

A mixture of 20 g. pyromellitic dianhydride (PMDA), recrystallized from acetic anhydride, and 40 g. anhydrous ethanol is refluxed 16 hours. To this reaction product, actually a mixture of the two isomers of diethyl pyromellitate, is added 18.35 g. 4,4'-oxydianiline in 150 g. methyl ethyl ketone. A clear, 16.7% solids by weight solution results.

Samples of this solution are placed on cold rolled steel with a film casting bar and baked in ovens. One sample is baked for one hour at 180° C. and another for 15 minutes at 300° C. Neither specimen gives a clear, continuous film. The solution cures to an opaque mass with poor flexibility and poor abrasion resistance.

EXAMPLE XV

The reaction product of pyromellitic dianhydride (PMDA) and ethanol, as described in Example XIV above, is evaporated to dryness at 70–100° C. A quantity of 15.5 g. of the dry diethyl esters is added to 51 g. dimethyl acetamide. To this in turn is added 10.0 g. 4,4'-oxydianiline (ODA) in 51 g. N-methylpyrrolidone. The 20% by weight solution, after application to cold rolled steel, is then baked out at 300° C. for 15 minutes. An opaque, non-flexible, easily abraded product results.

EXAMPLE XVI 7.27 grams of pyromellitic dianhydride (PMDA) is refluxed in 19.7 g. anhydrous ethanol for several hours. The excess alcohol is evaporated from the solid di-half esters at 100° C. and the resulting powder added to 27.8 g. cresylic acid. To this is added a solution of 8.33 g. 4,4'-oxydianiline (ODA) in 31.7 g. cresylic acid.

This 20% solids by weight solution when baked out in the manner of Examples XIV and XV gives essentially the same opaque discontinuous film obtained in those examples.

EXAMPLE XVII

Pyromellitic dianhydride is reacted with anhydrous methanol to produce the dimethyl ester of pyromellitic acid. To 2.82 g. of the diester in 4.5 g. methanol is added 2.10 g. 4,4'-oxydianiline (ODA) in 7 g. N-methylpyrrolidone. The resulting clear solution is baked out for 30 minutes at 175° C. or for 15 minutes at 300° C. In either case, an opaque, discontinuous mass forms that cannot qualify as a film.

EXAMPLE XVIII

A solution of 3.66 g. of the dibutyl ester of pyromellitic acid in 3.5 g. butanol is added to 2.10 g. 4,4'-oxydianiline in 10 g. N-methylpyrrolidone. This clear solution, when baked at 175° C. for 30 minutes gives the same unsatisfactory product as that of Example XVII.

EXAMPLE XIX

The tetramethyl ester of pyromellitic acid was also found not to react with oxydianiline in monomeric form to produce a useful film. The ester, 12.4 g., in 40 g. of a 1:1 by weight mixture of cresylic acid and Solvesso 100 is added to 8.8 g. 4,4'-oxydianiline in 41.5 g. cresylic acid. The clear solution, when baked out at 180° C. on cold rolled steel for one hour or at 300° C. for 15 minutes, gives a discontinuous, powdery mass lacking adhesion and flexibility.

The results of Examples XIV–XIX clearly demonstrate that the esters of pyromellitic acid cannot be compounded into a monomeric coating solution with oxydianiline which will cure to satisfactory films as is possible with the isomers of the di-half esters of dianhydride-forming isomers of benzophenone tetracarboxylic acid as well as those of the tetracarboxylic acids based on trimellitic anhydride.

EXAMPLE XX

This example is designed to show the further advantages of the monomeric solutions of this invention over preformed polymer coating compositions employing ingredients which would presumably lead upon curing to similar resinous structures.

Benzophenonetetracarboxylic acid dianhydride, 16.1 g., is added to 37.1 g. dimethylacetamide and the mixture heated to 50° C. with stirring. To this is added in turn 10 g. 4,4'-oxydianiline in 37.1 g. dimethylacetamide. The starting materials have been recrystallized several times and dried thoroughly. The solvent is dry. Stirring is continued for two hours and the viscous polymer solution diluted to 10% by weight total solids with N-methylpyrrolidone. The inherent viscosity of the reaction product is approximately 1.0.

This varnish was used to bond wire coils as in Example I. The bond strength data for the usual 1.5–2.0 mil thick coat is listed below.

| Varnish | Bond Strength of Coil Varnish, Pounds Breaking Strength | |
|---|---|---|
| | 25° C. | 180° C. |
| Example XX | 13.5 | 9.0 |

These figures show, as the "ML" varnish data of Example I does, that polymeric coating systems based on dianhydrides and diamines condensed to polyamides are not as good for bonding as the monomeric preparations. Such polyamide solutions however can be quite useful in other applications such as wire enameling (Example VI) and so on.

As mentioned earlier, the varnishes and solutions of this invention contain at least one compound selected from each of two classes of monomers, i.e., tetracarboxylic compound and a polyamino compound.

One of the tetracarboxylic compounds used in the practice of this invention is a tetracarboxylic, two benzenoid ring structure formed from two molecules of trimellitic anhydride joined through their free carboxylic groups, wherein the carboxylic groups on the tetracarboxylic compound are independently selected from the group consisting of carboxylic acid esters and free carboxylic acids.

These trimellitic derivatives are obtained by the condensation of two mols of trimellitic anhydride with one mol of another compound which is at least difunctional. The resulting tetracarboxylic structure therefore consists of two benzene rings, each having two carboxyl group substituents attached to adjacent carbon atoms, and joined together by any of the following linkages; amide, ester and thioester. Examples of specific compounds of this class are the condensation products of two mols of trimellitic anhydride with one mol of such molecules as glycol diacetate, triacetin, tolylene diisocyanate, methylene-bis(4-phenylisocyanate) and oxy-bis (4-phenylisocyanate) and a bisphenol such as 2,2-bis(p-hydroxyphenyl) propane. Similarly, other tetracarboxylic monomers may be obtained from trimellitic anhydride and derivatives of compounds such as ethanolamine, oxydianiline, phenylene diamine, diaminodiphenylamine, diaminodiphenylmethane, diaminodiphenylpropane, ethylene dithiol, 1-thioglycerol, α,α-dimercapto-p-xylene, 4,4'-diaminobenzophenone, and the like.

These trimellitic derivatives may be generally represented by the following structural formula:

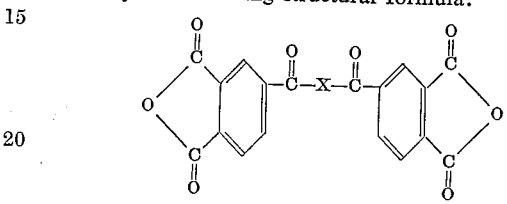

wherein X represents any of the compounds recited above, which are at least difunctional and which react with the two mols of trimellitic anhydride joining them together by either amide, ester or thioester linkages.

Prior to use in the practice of this invention, the anhydride structure on either the trimellitic anhydride or the derivatives of trimellitic anhydride must be converted to form carboxylic acid ester or free carboxylic acid components by any of the methods well known to those skilled in the art. The resulting tetracarboxylic structure which is used in the practice of this invention may be represented by the following structural formula:

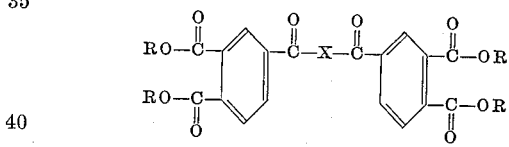

wherein R is independently selected from the group consisting of hydrogen and alkyl of from 1 to 6 carbon atoms.

Equally useful in the practice of this invention are tetracarboxylic compounds represented by the general formula:

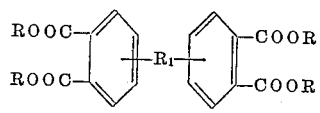

wherein R is independently selected from the group consisting of hydrogen and alkyl of from 1 to 6 carbon atoms and $R_1$ is selected from the group consisting of carbonyl, sulfur, sulfonyl, oxygen, phosphorous, phosphonyl, silicon and derivatives thereof, alkylene of from 1 to 6 carbon atoms and arylene of from 6 to 16 carbon atoms.

Examples of the foregoing $R_1$ bivalent radical would include methylene, ethylene, propylene, pentylene, hexylene; sulfur, sulfonyl; oxygen, phosphorous, phosphonyl, silicon and derivatives thereof; divalent aromatic radicals derived from benzene, toluene, xylene, naphthalene anthracene as well as bis-phenylene, diphenylene, diphenyl ether, ditolyl ether, diphenyl sulfide, diphenyl sulfone, diphenyl amine, etc.

Especially preferred are tetracarboxylic compounds of the above general structure wherein $R_1$ is carbonyl. These materials, which are designated as benzophenone tetracarboxylic compounds exist in different isomeric forms. Representative of these are the 2,2'-, 3,3'-; 2,3,3',4'-, and 3,3',4,4'-benzophenonetetracarboxyl compounds.

The preferred benzophenone tetracarboxylic compounds are the alkyl esters of benzophenone tetracarboxylic acid. Especially preferred is the diethyl esters of benzophenone tetracarboxylic acid.

It should be noted in regard to the foregoing formula that when $R_1$ is a substituent capable of further reaction, e.g., a carbonyl group, the resulting resin solution may be cured to a polymer that is infusible and insoluble in most of the well-known organic solvents. The carboxylic acid component of the present coating compositions is preferably an ester derivative prepared by the reaction of the corresponding dianhydride with an alkyl alcohol of 1 to about 6 carbon atoms, however, the free acid may also be used.

Although any of the primary diamines can be employed as the second necessary monomeric component of the solutions and varnishes of this invention, the actual selection of such a component will depend of course on the properties that are needed in the final cured resin. Properties to be considered in this respect are resistance to heat, adhesion to the substrate to be coated—be it class 220° C. enameled wire, glass cloth, cold rolled steel or something else, flexibility, abrasion resistance, and so on. With this in mind, the primary diamines that may be selected to react with the carboxylic compounds of the present preparations are saturated aliphatic diamines containing from 2 to 6 carbon atoms, aromatic diamines containing from 6 to 16 carbon atoms and mixed aliphatic-aromatic diamines containing from 7 to 36 carbon atoms. Included in these classes are the diamines of the bivalent radicals of such compounds as benzene, xylene, toluene, naphthalene, biphenyl, diphenyl ether, ditolyl ether, diphenyl sulfide, diphenylamine, diphenyl sulfone, diphenylmethane, diphenylpropane, benzophenone; also included are hexamethylene diamine, octamethylene diamine, 3-methoxyhexamethylene diamine, 2,5-diamino-1,3,4-oxadiazole, etc.

Other useful diamino compounds are 4,4'-thioaniline diphenyl ether, oxydianiline, methylene dianiline, 4,4'-diaminotriphenylamine, polymethylene polyaniline made by the reaction of aniline with formaldehyde:

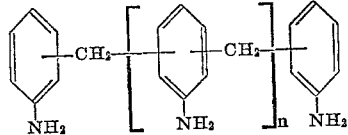

where $n$ can vary from 0 to 3; the reaction products of diacyl halides with excess diamines:

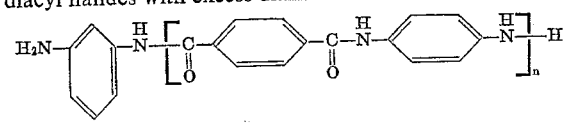

where $n$ may be 1 to 4. Other similar compounds which lead to greater crosslinking of the ultimate polymer chains on curing can also be included provided that they do not react with the solution components before curing.

The preferred diamines can be represented by the general formula:

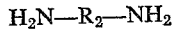

$$H_2N—R_2—NH_2$$

wherein $R_2$ may be

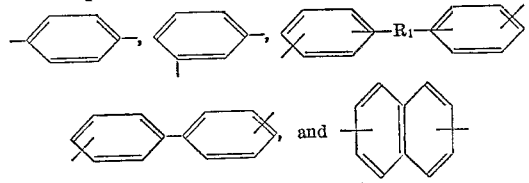

wherein $R_1$ is selected from the group consisting of carbonyl, sulfur, sulfonyl, oxygen, phosphonyl, phosphorous, silicon and derivatives thereof, alkylene of from 1 to 6 carbon atoms and arylene of from 6 to 16 carbon atoms.

Especially preferred diamines are the 4,4'-oxydianiline, meta and para phenylene diamines, and methylene dianiline.

It is not inconsistent with this invention also to incorporate triamines in the monomeric solutions. In this regard, melamine has been found to be especially useful in improving the high temperature properties of laminates impregnated with the compositions of this invention as is illustrated in the following table.

| Example | Amines in Charge B | Grams | Equiv. of Amines per Equiv. of Carboxylic Compound | Flexural Strength,[2] p.s.i. |
|---|---|---|---|---|
| XXI | m-PBA [1] | 127.7 | 1.0 | 21,500 |
| XXII | m-PBA | 115.0 | 0.9 | 24,700 |
|  | Melamine | 10.0 | 0.1 |  |
| XXIII | A-PBA | 122 | 0.95 | 23,200 |
|  | Melamine | 4.92 | 0.05 |  |
| XXIV | m-PBA | 115 | 0.9 | 24,900 |
|  | Melamine | 15 | 0.15 |  |

[1] Meta-Phenylene diamine.
[2] After 100 hours at 700° F.

The diethyl ester of benzophenone tetracarboxylic acid is used as the carboxylic acid component and the solution of monomers is prepared according to the procedure of Example I. The glass laminates are prepared according to the procedure set forth in Example IX and tested on an Instron tester.

The data in Table I shows that improved flexural strength is achieved when melamine is incorporated into the compositions of this invention. In this regard, one might substitute melamine for up to 75 weight percent of the primary diamine used. Equally useful are the derivatives of melamine which show a greater solubility in organic solvents than does melamine itself, e.g., the N-alkyl, N-methanolated and the etherified derivatives of N-methanolated melamine.

Useful solvents with which to prepare the monomeric solutions disclosed include inert organic liquids such as the lower alkyl alcohols (1–6 carbon atoms), acetone, methyl ethyl ketone, dioxane, cresol, toluol, N-methylpyrrolidone, dimethylacetamide, dimethylformamide, high boiling petroleum hydrocarbons and mixtures thereof. Mixture of water with certain organic liquids such as acetone and ethyl alcohol may be used where the solubility of the particular monomers permit.

The solids content of the solutions may range from 3 to 75% by weight, although most coating applications are more economically carried out with solutions containing 15 to 60% solids. In the case of electrical varnishes, solids contents of 20–60% have been found most satisfactory. Within these limits, the exact concentration used ultimately hinges on the thickness of the coating desired. In general, it should be noted that because of the monomeric nature of the reactants in these solutions, a greater range of usable concentrations is available since the viscosity problems encountered with polymeric materials is minimized. Intimate mixtures of the dry solid monomers may also be used for certain operations such as molding powders, fluid bed coating of various materials, etc.

The following Example XXV illustrates the use of the compositions of this invention as molding powders.

EXAMPLE XXV

An equimolar 2B ethanol solution of the diethyl ester of benzophenone tetracarboxylic acid dianhydride and m-phenylene diamine is evaporated to dryness using a Rinco evaporator at 50° C. and partial vacuum. This intimate mixture of dry solid reactants is then pre-heated at 110° C. for 5 hours, at 135° C. for 5 hours, ground to a fine powder, and then pressed in a mold for one hour at 13,000 p.s.i. and 600° F. to give a disc having a diameter of 2¼ inches and a height of ¼ inch. This disc is then post cured at 300° C. for 9 hours with only a 1.4% weight loss.

This disc does not shatter when dropped onto a concrete floor from a height of 10 feet.

The proportions of monomers can vary, on a molar basis from about a 5% excess of the di-half ester compound to about a 70% excess of the diamine. Preferred however are chemically equivalent amounts of both types of monomers or a molar excess of the amine monomer of up to 50%.

The monomeric coatings of this invention may be cured at any temperature within the range of 125° to 400° C. The actual temperature selected will depend on the heat resistance of the substrate coated, the time of cure desired, the cost factor in operating high temperature ovens, the type of equipment employed, the flexural breaking strength that the cured resin need achieve and the particular monomers employed. In general the range of 150° to 225° C. will be most economical for the majority of possible applications.

While most of the applications disclosed in the present specification require the use of solutions of monomers followed by "in situ" condensation, it must be pointed out that the condensation of variants of these monomers can be caused, by heat, to take place in the solution to yield polyamides which may be applied to a substrate and then cured into useful resins. Such polymeric solutions and methods for their preparation have already been disclosed in U.S. Patent 3,190,856. The preparation of the wire enamel shown in Example VI of this disclosure affords another means of taking advantage of the unusual properties of the particular monomers with which these applications are concerned.

It has now been established that solutions of the polyamides can be obtained in such solvent systems as cresylic acid-phenol-water. Given the type of reaction involved, and the hydroxylic nature of the solvents just mentioned, that the condensation of anhydride functions with amino groups can occur at all is rather unexpected. Be that as it may, it has been found that if such a system is heated at temperatures ranging from 85° to 125° C., polymeric solutions will be obtained which have a Brookfield viscosity of up to 9000 centipoises at 25° C. Prolonged heating at those temperatures should be avoided prior to final application. The exact period of heating will depend of course on the temperature selected and in general should be approximately 30 minutes. Preferred conditions for this polymeric solution system are chemically equivalent proportions of monomers, and an initial polymerization charge containing 30–50% by weight of reactants which can be ultimately diluted to a 15–40% solids by weight polymeric solution.

The solutions of this invention can be used, as shown by the examples as varnishes for electrical equipment, in the manufacture of a glass laminate for printed circuits, as structural adhesives, and so on.

It is evident also that their excellent combination of properties such as ease of application, stability on storage, wide range of available concentrations, relatively low cost, as well as the remarkably heat resistant cured products which they form, will suggest many other uses to those skilled in the art. For instance, the solutions may be employed to impregnate various natural and synthetic fabrics other than glass cloth. They can be used as wire enamels. Furthermore, the flexibility of thin films (less than 2 mils) of the cured resin yielded by these solutions suggests their employment in metallic foil and strip coating for electric capacitors and distribution transformers of advance type.

It is obvious that many deviations may be made in the products and processes set forth above without departing from the scope of this invention.

What is claimed is:

1. A composition comprising a 3–75% by weight solution of a polyamine and a tetracarboxylic compound present in a proportion selected from the range of about 70% molar excess of the polyamine to about 5% molar excess of the tetracarboxylic compound; wherein the polyamine is selected from the class consisting of aliphatic primary diamines of from 2 to about 6 carbon atoms, aromatic primary diamines of from 6 to about 36 carbon atoms, aliphatic-aromatic primary diamines, triamines and mixtures thereof; wherein the tetracarboxylic compound is selected from the group consisting of benzophenone tetracarboxylic acid and alkyl diester derivatives of benzophenone tetracarboxylic acid, wherein the alkyl group contains from 1 to 6 carbon atoms.

2. The composition of claim 1 wherein the polyamine component is represented by the general formula $$H_2N—R_2—NH_2$$

wherein $R_2$ is a divalent aromatic radical.

3. The composition of claim 1 wherein the tetracarboxylic component is the di-ethyl ester derivative of benzophenone tetracarboxylic acid.

4. The composition of claim 1 wherein the polyamine component is selected from the grup consisting of meta-phenylene diamine, para-phenylene diamine, 4,4'-oxydianiline and methylene diamine and mixtures thereof.

5. A varnish for bonding electrical equipment components and coating substrates to be laminated which comprises a 20–60% by weight solution of a polyamine and a tetracarboxylic compound present in a proportion selected from the range of about 70% molar excess of the polyamine to about 5% molar excess of the tetracarboxylic compound; wherein the polyamine is selected from the class consisting of aliphatic primary diamines of from 2 to about 6 carbon atoms, aromatic primary diamines of from 6 to about 36 carbon atoms, aliphatic-aromatic primary diamines, triamines and mixtures thereof; wherein the tetracarboxylic component is selected from the group consisting of benzophenone tetracarboxylic acid and alkyl diester derivatives of benzophenone tetracarboxylic acid, wherein the alkyl group contains from 1 to 6 carbon atoms.

6. The composition of claim 5 wherein the polyamine component represented by the general formula $$H_2N—R_2—NH_2$$

wherein $R_2$ is a divalent aromatic radical.

7. The composition of claim 5 wherein the tetracarboxylic component is the di-ethyl ester derivative of benzophenone tetracarboxylic acid.

8. The composition of claim 5 wherein the polyamine component is selected from the group consisting of meta-phenylene diamine, para-phenylene diamine, 4,4'-oxydianiline and methylene diamine and mixtures thereof.

9. A process for preparing a cross-linked polymeric condensate which comprises:
   (A) Preparing a 3–75% by weight solution of a polyamine and a tetracarboxylic compound present in a proportion selected from the range of about 70% molar excess of the polyamine to about 5% molar excess of the tetracarboxylic compound; wherein the polyamine is selected from the class consisting of aliphatic primary diamines of from 2 to about 6 carbon atoms, aromatic primary diamines of from 6 to about 36 carbon atoms, aliphatic-aromatic primary diamines, triamines and mixtures thereof; wherein the tetracarboxylic compound is selected from the group consisting of benzophenone tetracarboxylic acid and alkyl diester derivatives of benzophenone tetracarboxylic acid, wherein the alkyl group contains from 1 to 6 carbon atoms,
   (B) Applying the solution of the polyamine and tetracarboxylic compound to a substrate; and then
   (C) Heating the coated substrate at temperatures within the range of 125° to 400° C.

10. A glass laminate comprising multiple layers of glass fibers bonded by heat and pressure, each layer having previously been impregnated with a composition comprising a 3–75% by weight solution of a polyamine and a tetracarboxylic compound present in a proportion selected from the range of about 70% molar excess of the polyamine to about 5% molar excess of the tetracarboxylic compound; wherein the polyamine is selected from the class consisting of aliphatic primary diamines of from 2 to about 6 carbon atoms, aromatic primary diamines of from 6 to about 36 carbon atoms, aliphatic-aromatic primary diamines, triamines and mixtures thereof; wherein the tetracarboxylic component is selected from the group consisting of benzophenone tetracarboxylic acid and the alkyl diester derivatives of benzophenone tetracarboxylic acid, wherein the alkyl group contains from 1 to 6 carbon atoms.

11. Electrical components coated with the cured reaction product of a polyamine and a tetracarboxylic compound present in a proportion selected from the range of about 70% molar excess of the polyamine to about 5% molar excess of the tetracarboxylic compound; wherein the polyamine is selected from the class consisting of aliphatic primary diamines of from 2 to 6 carbon atoms, aromatic primary diamines of from 6 to about 36 carbon atoms, aliphatic-aromatic primary diamines, triamines, and mixtures thereof; wherein the tetracarboxylic component is selected from the group consisting of benzophenone tetracarboxylic acid and the alkyl diester derivatives of benzophenone tetracarboxylic acid, wherein the alkyl group contains from 1 to 6 carbon atoms.

12. A composition suitable for use as a molding powder, fluid bed coating and other related uses which comprises an intimate mixture of a polyamine and a tetracarboxylic compound present in a proportion selected from the range of about 70% molar excess of the polyamine to about 5% molar excess of the tetracarboxylic compound; wherein the polyamine is selected from the class consisting of aliphatic primary diamines of from 2 to about 6 carbon atoms, aromatic primary diamines of from 6 to about 36 carbon atoms and aliphatic-aromatic primary diamines, triamines and mixtures thereof; wherein the tetracarboxylic component is selected from the group consisting of benzophenone tetracarboxylic acid and the alkyl diester of benzophenone tetracarboxylic acid, wherein the alkyl group contains from 1 to 6 carbon atoms.

References Cited
UNITED STATES PATENTS

| | | | |
|---|---|---|---|
| 2,944,993 | 7/1960 | Brebner et al. | 260—33.4 |
| 3,075,942 | 1/1963 | Bozer et al. | 260—65 |
| 3,179,614 | 4/1965 | Edwards. | |
| 3,179,634 | 4/1965 | Edwards. | |
| 3,182,073 | 5/1965 | Loncrini. | |
| 3,190,856 | 6/1965 | Lavin et al. | 260—65 |

FOREIGN PATENTS 1,360,488  3/1964  France.

MORRIS LIEBMAN, *Primary Examiner.*

B. A. AMERNICK, *Assistant Examiner.*